United States Patent [19]

Baker et al.

[11] Patent Number: 4,760,548

[45] Date of Patent: Jul. 26, 1988

[54] METHOD AND APPARATUS FOR PRODUCING A CURVE IMAGE

[75] Inventors: David C. Baker; Arthur A. Kauffman, Jr., both of Austin, Tex.

[73] Assignee: International Business Machines Corporation, Armonk, N.Y.

[21] Appl. No.: 873,902

[22] Filed: Jun. 13, 1986

[51] Int. Cl.$^4$ ............................................. G06F 15/31
[52] U.S. Cl. .................................................... 364/718
[58] Field of Search ............... 364/718, 719, 720, 721, 364/722

[56] References Cited

U.S. PATENT DOCUMENTS

| | | | |
|---|---|---|---|
| 4,272,808 | 6/1981 | Hartwig | 364/718 |
| 4,441,104 | 4/1984 | Finney | 340/724 |
| 4,484,298 | 11/1984 | Inoue et al. | 364/720 |

OTHER PUBLICATIONS

IBM Technical Disclosure Bulletin, vol. 25, No. 11B, Apr. 1983 to Wahl and Wong, pp. 5880–5882, entitled "High Speeds for Generating or Updating Graphics with Splines on a Screen".

IBM Technical Disclosure Bulletin, vol. 23, No. 1, Jun. 1980 to Niehoff, pp. 155–157, entitled "Graphics Clipping of Polystrings and Polygons".

Article on "Local Control of Bias and Tension in Beta-Splines", by Barskey & Beatty in ACM Transactions on Graphics, vol. 2, No. 2, Apr. 1983, pp. 109–134.

Article on "An Application of Bertrand Curves and Surfaces to CADCAM", in Computer-Aided Designs, vol. 17, No. 8, Oct. 1985, pp. 348–352 to Papaioannou and Kiritsis.

Primary Examiner—David H. Malzahn
Attorney, Agent, or Firm—Thomas E. Tyson

[57] ABSTRACT

A method and apparatus of providing a visual representation of a curve image wherein curve image data is provided by a B-Spline equation computed with a forward difference technique using scaled integer variables. The method provides for the scaling of the initial base matrix computation of the geometry vector coefficients followed by the computation of the forward difference interval coefficients using integer arithmetic. The curve coordinate values for each interval are computed from the forward difference interval coefficient integers descaled by the scaling parameter. By employing integer arithmetic in a divide approximation technique, the use of floating point arithmetic is avoided. The apparatus for producing the visual representation of the curve image includes a computational section that provides for pipelined computations of the forward difference interval coefficients to provide high-speed curve coordinate value computation.

14 Claims, 7 Drawing Sheets

METHOD AND APPARATUS FOR PRODUCING A CURVE IMAGE

TECHNICAL FIELD

The present invention relates to computer graphics and more specifically to a method and apparatus for generating curves on computer graphics displays.

BACKGROUND ART

The evolution of computer technology has resulted in the creation of a sophisticated technical area devoted to the representation of graphical information generated by computers. This area is termed computer graphics. One technique that is commonly used in computer graphics is that of producing a set of points and connecting these points with straight lines. The resulting combination of points and straight lines are displayed on the computer graphics terminal display which normally consists of a cathode ray tube. It is also desirous to produce curves relative to certain points on the display. Generating smooth curves on a graphical display is often done by constructing a composite curve that is accomplished by fitting successive low-degree polynomials to successive groups of data points. The resulting piecewise polynomial function will appear to be a continuous curve but will in general have perceptible discontinuities in slopes of curvative at joints between successive curve segments unless specific curve types or forms are used. This technique is a kin to the use of a "French curve" in drafting where it is desired to fit a curve for a complete set of points by using segments of the French curve surface. Using the French curve, a draftsman will attempt to fit a small number of points onto a segment of the French curve edge and draw a portion of this segment. The draftsman will then continually connect additional segments together by repeating this technique until all the points have been included in a curve. In computer graphics, this same end is accomplished by fitting the points with the successive low-degree polynomial equations to produce the curve values in the dimensional coordinate system.

In a two-dimensional space, a curve is often expressed as a function of the orthogonal components x and y, i.e., Y is equal to f(x). In a three-dimensional coordinate system, the x, y and z coordinates may also be represented as functions of one or two of the orthogonal components. However, these representations may cause difficulty in generating the coordinate values. One alternative technique is to use a parametric representation of the curve or a representation where each coordinate value on a curve is represented as a function of some common variable, that is, a variable common to all coordinate components. For a three dimensional system, such a variable may be described as t resulting in the following: $x=f(t)$; $y=g(t)$; and $c=h(t)$; for $0<t<1$. A further representation is a parametric cubic curve that is represented by third order polynomials.

$$x=f(t)=a_x t^3 + b_x t^2 + c_x t + d_x$$

$$y=g(t)=a_y t^3 + b_y t^2 + c_y t + d_y$$

$$z=h(t)=a_z t^3 + b_z t^2 + c_z t + d_z$$

Cubic curves are important because no lower-order representation of curve segments can provide either continuity of position and slope or continuity of slope and curvature at the point where the curve segments meet. Cubic curves are also the lowest order curves that can render non-planar curves in three dimensions.

The equation for the x coordinate above may be represented in the following matrix fashion:

$$x = [t^3\; t^2\; t\; 1] * \begin{bmatrix} a_x \\ b_x \\ c_x \\ d_x \end{bmatrix} = [T] * [c_x]$$

The coefficient vector $[c_x]$ can be derived to yield curves of many different properties. The most useful derivations are the Hermite form, the Bezier form and the B-Spline form. One can break the coefficient vector into the cross product of a 4×4 basis matrix $[M]$ multiplied by a columnar geometry vector $[G_x]$.

A general review of the forms of these curves is contained in the publication entitled *Fundamentals of Interactive Computer Graphics* by James D. Foley and Andries VanDam published by Addison-Wesley Publishing Company (1982); *Principles of Interactive Computer Graphics*, second edition, by William M. Newman and Robert F. Sproull published by McGraw-Hill Book Company (1979); and *Computer Aided Geometric Design*, edited by Robert E. Barnhill and Richard F. Riesenfeld from Academic Press (1974).

The one embodiment of the following invention is a method and apparatus for producing curves from the B-Spline form. The B-Spline form is explained *Fundamentals of Interactive Computer Graphics*, page 521 through 523 (herein incorporated by reference).

One technique in generating graphics with splines is disclosed in the IBM Technical Disclosure Bulletin, Volume 25, No. 11b (April, 1983) entitled "High Speeds for Generating or Updating Graphics with Splines on a Screen". The technique disclosed illustrates an analog computer implementation using an exact integration to evaluate the polynomial.

Using digital processors, floating point arithmetic is required to compute the matrix arithmetic operations for computing the coordinate values. This floating point arithmetic requirement is disadvantageous because (1) it is very time consuming and (2) it is not entirely accurate. The inaccuracy results from the requirement of repetitive floating point operations. By its very nature, a single floating point operation is inexact resulting in a small error. This small error is compounded each time the results from one floating point operation is used in a second floating point operation. Therefore, performing a series of floating point operations will result in a compounded inaccuracy by its very nature.

It is an object of the present invention to provide a method and apparatus for providing curves using the B-Spline form in a more accurate manner than provided by the traditional floating point technique.

It is also an object of the present invention to provide a high-speed method and apparatus for producing B-Spline curves.

DISCLOSURE OF THE INVENTION

In accordance with the present invention, a method for producing a visual representation of a curve image on a display from a set of control point inputs is provided. A set of control points are input for each dimension for the curve. Additionally, a number of intervals is specified. This number of intervals define the number of curve coordinate values that must be computed between each of the control points. The method includes the steps of (1) computing a set of scaled vector coefficient integers for each dimension from a set of input control points for that dimension and from a scaling parameter, (2) computing forward difference interval coefficient integers for each dimension for each interval from the scaled vector coefficient integers for that dimension and the interval integer number, (3) computing the curve coordinate values for each interval for each dimension from the forward difference interval coefficient integers for that dimension and for each interval and the scaling parameter, and (4) displaying the curve by displaying curve coordinate points in accordance with the computed curve coordinate values for each dimension and a plurality of straight lines which successively connect the computed curve coordinate points.

Also, in accordance with the present invention, an apparatus for producing a visual representation of a curve image is provided that includes input means that receives a plurality of data points defining the curve image and a number of interval computations to be performed between these data points. Also included is a processing circuit for computing the curve coordinate values for each dimension for each interval wherein the curve coordinate value computations for several of the intervals are performed simultaneously. This apparatus further includes a displaying circuit for producing the visual representation of the curve image by displaying curve coordinate points in accordance with the computed curve coordinate values for each dimension in a plurality of straight lines which successively connect the computed curve coordinate points.

Both the method and the apparatus involve the computation of the vector coefficient using integer arithmetic. The integer arithmetic results from the use of scaled values in the computation. In other words, the original values are scaled such that the vector coefficient computations and all other computations performed to compute the curve coordinate values are accomplished with integer arithmetic. This is accomplished by the scaling of the initial parameters used in the computation and also in performing any divisions required as the last step of the computational process. The use of integer arithmetic increases both the speed and accuracy of resulting computations. Furthermore, since the computations are performed on intervals, these computations may be performed in separate stages that may be pipelined such that the computational stages may be performed simultaneously.

In the method, the integer arithmetic multiplication operations are performed hy binary shifting operations. In the apparatus, the adding operations are performed by adders placed serially with the registers such that the computations may be performed in a pipelined fashion. Shift operations are implemental in the paths connecting registers. In the preferred embodiment, the final computational stage includes a division operation which is performed by an approximate division method only requiring binary shifting and adding rather than a floating point operation. The binary shifting and adding operations are implemented in the apparatus by shifting data into registers and adders arranged in a serial fashion to promote the pipelining operation.

BRIEF DESCRIPTION OF THE DRAWING

The novel features believed characteristic of the invention are set forth in the appended claims. The invention itself, however, as well as other features and advantages thereof, will be best understood by reference to the following description of the Best Mode for Carrying Out the Invention, when read in conjunction with the accompanying figures, wherein:

BEST MODE FOR CARRYING OUT THE INVENTION

Figure 1:
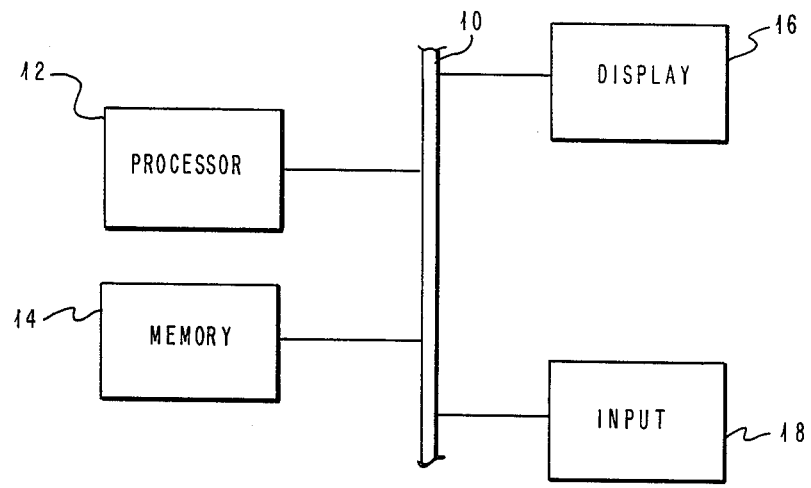
FIG. 1 is a block diagram of a computer graphics unit.

In FIG. 1, a block diagram of a computer graphics unit is illustrated. Processor 12 is connected to an input-/output (I/O) bus. The processor 12 is the heart of the svstem and performs all processing to transform user inputs from the input circuitry 18 to produce a graphics display on the display circuitry 16. Memory 14 is also connected to the I/O bus 10 and provides a temporary storage for data and addresses and may also provide storage for the software instructions that are executed by processor 12 in performing the computer graphics task.

One technique to produce a curve implementino the B-Spline form is to generate a set of parametric increment values for coordinate points. One such technique is referred to as B-Spline forward differencing. Forward differencing is discussed in *Principles of Interactive Computer Graphics,* pages 326 to 329 herein incorporated by reference. Forward differencing is a technique of approximating coordinate value. Using this incrementing technique, one may compute the B-Spline curve coordinate values. In this manner, the complete B-Spline curve may be specified as a set of coordinate values. The coordinate values may be combined to define points of the curve in the coordinate system. In other words, using the B-Spline form forward differencing technique, coordinate values for all orthogonal components (such as x, y and z) are computed and represent the curve in the resulting coordinate system.

It is the property of the B-Spline form that the points used to specify the curve are located such that the resulting curve may not pass through these points. Therefore, in a system where the user desires the curve to pass through the points specified, an interpolating spline technique is used here. This technique is described in *Computer Aided Geometric Design,* pages 317 to 326. By using the interpolating splines, the user input points are converted into control points or knots that are used to define the B-Spline curve. However, this invention will address only B-Spline curves specified as control points.

As described in the background, the preferred embodiment of the present invention is related to the implementation of a B-Spline form of curve generation.

One method of forming a B-Spline curve is by the implementation of the following equation for each of the dimensional coordinates:

$$x(t) = [t^3 \; t^2 \; t \; 1] \, [1/6] \begin{bmatrix} -1 & 3 & -3 & 1 \\ 3 & -6 & 3 & 0 \\ -3 & 0 & 3 & 0 \\ 1 & 4 & 1 & 0 \end{bmatrix} \begin{bmatrix} P_{i-1} \\ P_i \\ P_{i+1} \\ P_{i+2} \end{bmatrix}$$

Parameter Vector$_p$  Basis Matrix M  Geometry Vector G

Figure 2:
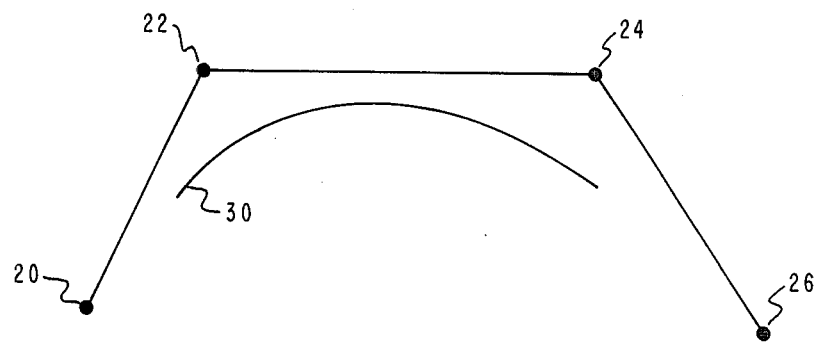
FIG. 2 is a representation of a B-Spline curve and control points.

It should be understood that this equation must be solved for each of the coordinate values separately, i.e., for y(t) and if necessary, z(t). In the above equation, $P_{i-1}$, $P_i$, $P_{i+1}$, and $P_{i+2}$ represent X-axis coordinates of B-Spline control points. The B-Spline control points are illustrated in FIG. 2 as points 20, 22, 24, and 26 that collectively define a B-Spline curve 30. As previously mentioned, the B-Spline 30 does not pass through any of the control points 20, 22, 24, or 26. The following explanation of the present invention is based on the assumption that the user specifies the desired B-Spline curve segments by specifying control points. It should be understood, however, that the user may specify points in which the user desires a curve to pass through. As previously discussed, an interpolating spline technique would be used to transform the "pass through" points to control points. Therefore, in that manner, the computer can fit curves to a set of points in a manner similar to a draftsman using a French curve as previously discussed.

The analogy to the French curve technique is appropriate because both the following B-Spline technique and the French curve technique use a small number of points to define a curve segment and the curve segments are connected together by sequentially using the points to form the connecting segments resulting in a continuous curve.

Referring to FIG. 1, the user will typically input an array of control points through input circuitry 18, such as a keyboard. These control points will be stored in memory 14. Processor 12 will then execute a set of instructions also contained in memory 14 to produce a set of curve coordinate points. These curve coordinate points are then connected by straight lines to produce a curve image which is displayed to the user on display circuitry 16, such as a cathode ray tube. If the number of control points and the number of iterations defining the computations of curve coordinate values between the control points are large enough, the user will not be able to clearly see any of the straight line segments connecting the points in the curve image displayed in display circuitry 16 and therefore, the curve image will appear as a continuous curve. The software instructions executed by the processor 12 are illustrated in flow chart form in FIGS. 3A and 3B. The software illustrated in FIGS. 3A and 3B perform the forward difference method of computing curve coordinate values between the control points specified. Specifically, the computations are scaled such that the arithmetic performed for the forward difference method is integer arithmetic. Appendix A details the basic cubic B-Spline matrix formula and discusses the forward difference method using floating point and using scaled integers. The flow chart illustrated in FIG. 3A begins with the start position 40 that sequences into an initialization of the outer loop count block 42. The next step is a decision step 44 to determine if the current count of I is less than the quantity NUMPTS−3. In the software, NUMPTS is the number of control points that have been input. The software refers to these control points as an array P. During the computations, control points in groups of four are used to compute the B-Spline segments. Therefore, in step 48, the variables P1, P2, P3 and P4 are set equal to four consecutive control points for the segment calculation. The next step 49, computes the actual B-Spline segments. The computation of the B-Spline segment is illustrated in the flow chart of FIG. 3B. After the B-Spline segment has been computed, the outer loop count I is incremented in step 50 and decision step 44 is then executed. Once I is greater than the number of control points input minus 3, the program is exited as illustrated by step 46.

Figure 3A:
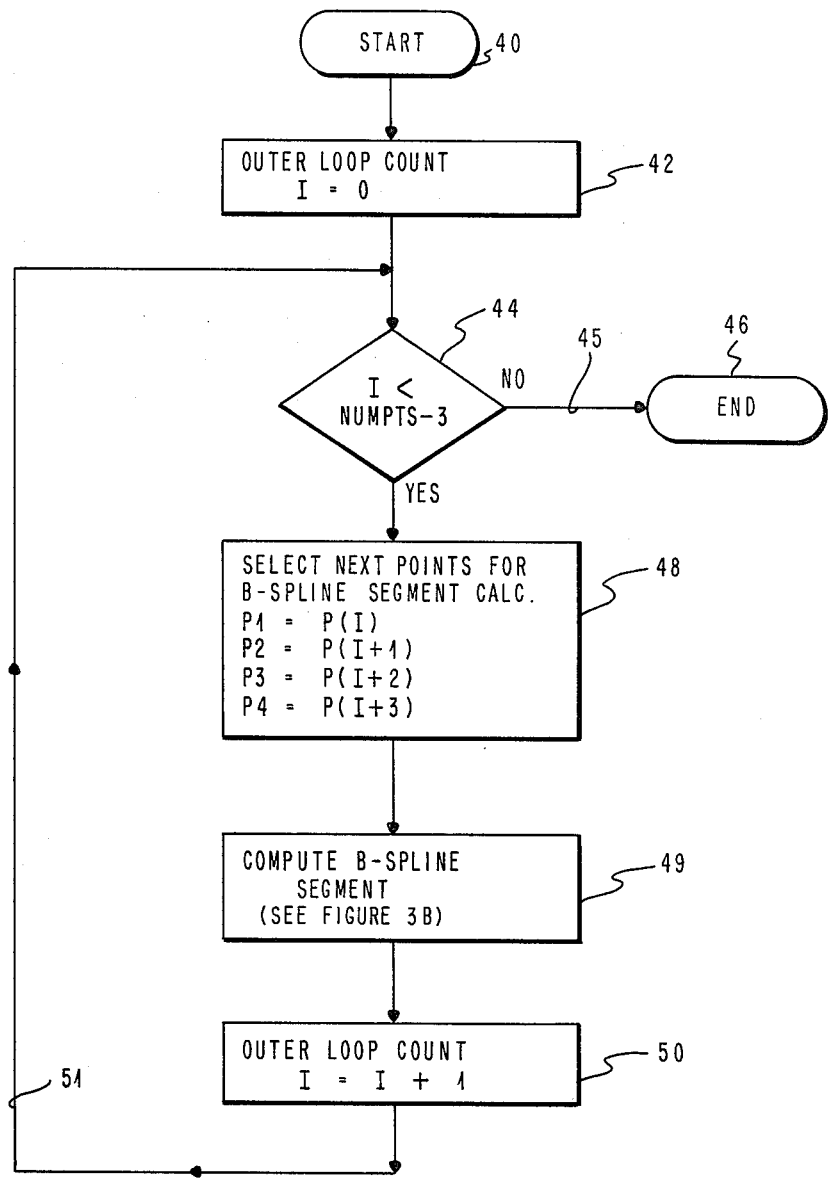
FIG. 3A is a flow chart for the software that produces the curve coordinate values.
Figure 3B:
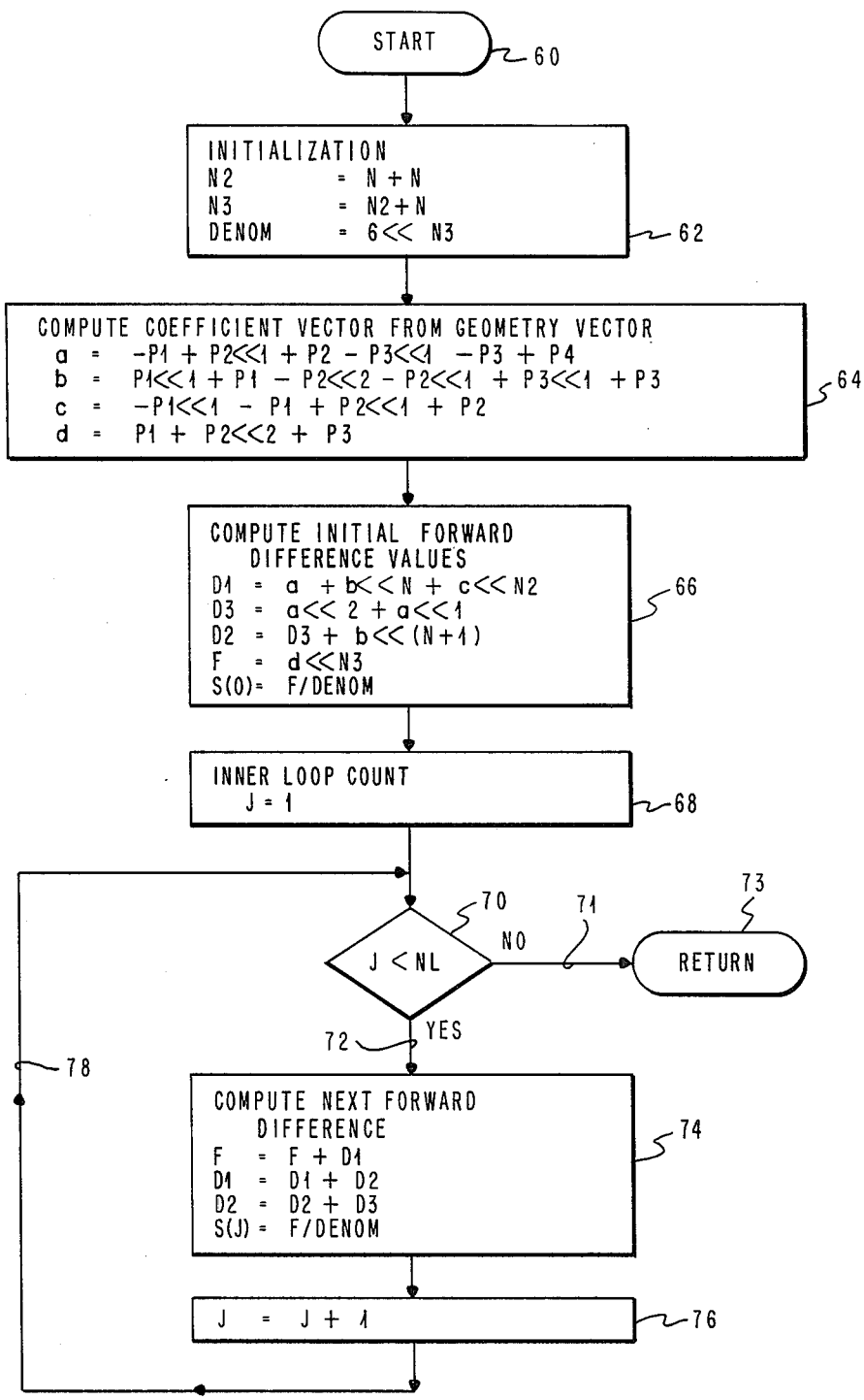
FIG. 3B is a flow chart of the software used to compute the B-Spline segment values.

Referring to FIG. 3B, the program is entered in step 60 which sequences to the initialization stage in step 62. The variables N2, N3, and DENOM are initialized. N2 is set equal to N+N where N=LOG$_2$(NL) where NL is the number of intervals to be computed. N3 is equal to N2+N. DENOM (the denominator) is set equal to 6 shifted left by N3 (the symbol "<<" signifies a left shift). DENOM is the scaling parameter which combines the divide by 6 operation with the integer scale multiplication (N3). By delaying the division of DENOM until the last step, multiplication and addition for the remaining steps can be performed in integer arithmetic. The next step 64 computes the geometry vector coefficients vector [a, b, c, and d] computed from the cross product of the basis matrix (M) and the geometry vector (G). The variables P1, P2, P3 and P4 are the control points that have been input in step 48 of FIG. 3A. In step 64, the left shifting of a variable by certain numbers is the equivalent to the binary multiplication of that number. In step 66, the initial forward difference values are computed. These values include D1 (the first difference), D2 (the second difference), D3 (the third difference), and F (the function result on the actual spline coordinate value). Furthermore, the first curve coordinate value S[0] is computed as F/DENOM. The forward difference value F is divided by the DENOM parameter which performs the division by 6 and the descaling in the same operation. This division may be performed by an integer division operation in the processor or, in another embodiment, it may be approximated by a division approximation technique to be discussed.

The next step 68 initiates the inner loop count at 1. The inner loop is then entered in step 70 in determining whether or not J is less than NL, which is the actual number of iterations input. It should be understood that NL is an input value that specifies the number of curve coordinate values computations to be performed between the control points, or in other words, the number of computations to be performed in the inner loop. The inner loop consists of steps 70, 74, 76 and the feedback line 78. After step 70, step 74 is performed and computes the next forward difference value and the curve coordinate value S[J]. In step 76, J is incremented and step 70 is repeated. This inner loop is executed until J equals the number of iterations. The loop then is exited by line 71 to step 73 which returns the processor to step 50 (see FIG. 3A).

It should be understood that the software of FIGS. 3A and 3B must be executed for each coordinate element, i.e., for X and for Y and, if necessary, for Z. In the preferred embodiment, the number of iterations to be performed (NL) is said equal to 32. Also, as previously stated, the divide operation may be performed by a divide approximation technique illustrated in Appendix B totally eliminating the need for any integer divide operations for the performance of the software illustrated in FIGS. 3A and 3B.

Figure 4:
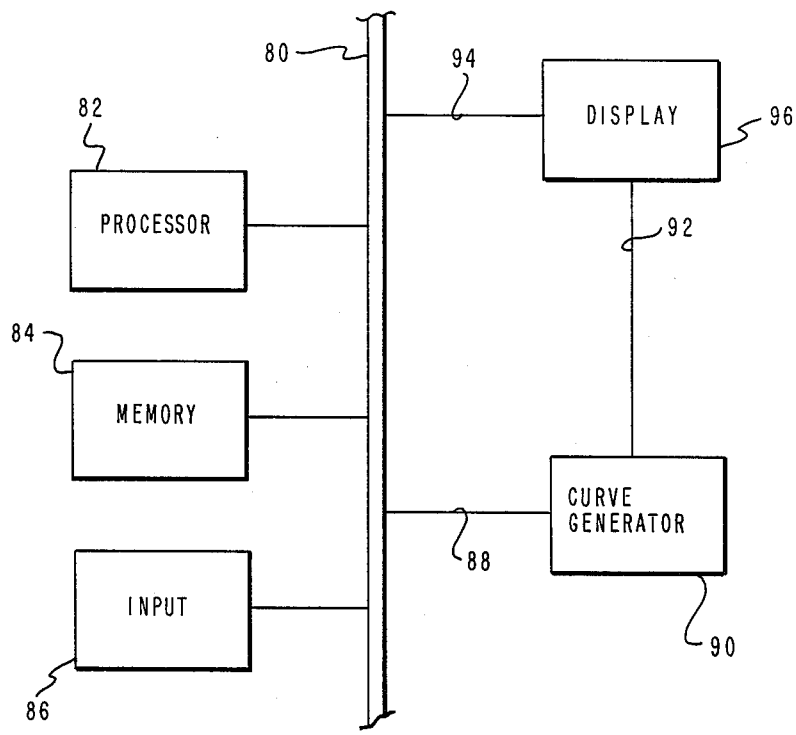
FIG. 4 is a block diagram of a graphics computer unit employing an embodiment of the present invention.

FIG. 4 is a block diagram of another embodiment of the present invention. In FIG. 4, a processor 82 is connected to an I/O bus 80 together with a memory 84 and an input device 86. Display circuitry 96 is also connected by line 94 to the I/O bus 80. Additionally, a curve generator circuit 90 is connected to the I/O bus 80 by a line 88 and also includes a connection 92 to the display circuitry 96. In a normal operation of this apparatus in FIG. 4, line 94 would be used to initialize the display. The data for the curve image would be input directly to the display circuitry 90 via line 92 from the curve generator circuit 90. The embodiment illustrated in FIG. 4 offloads much of the software execution burden from processor 82 resulting in an increased speed of operation.

Figure 5:
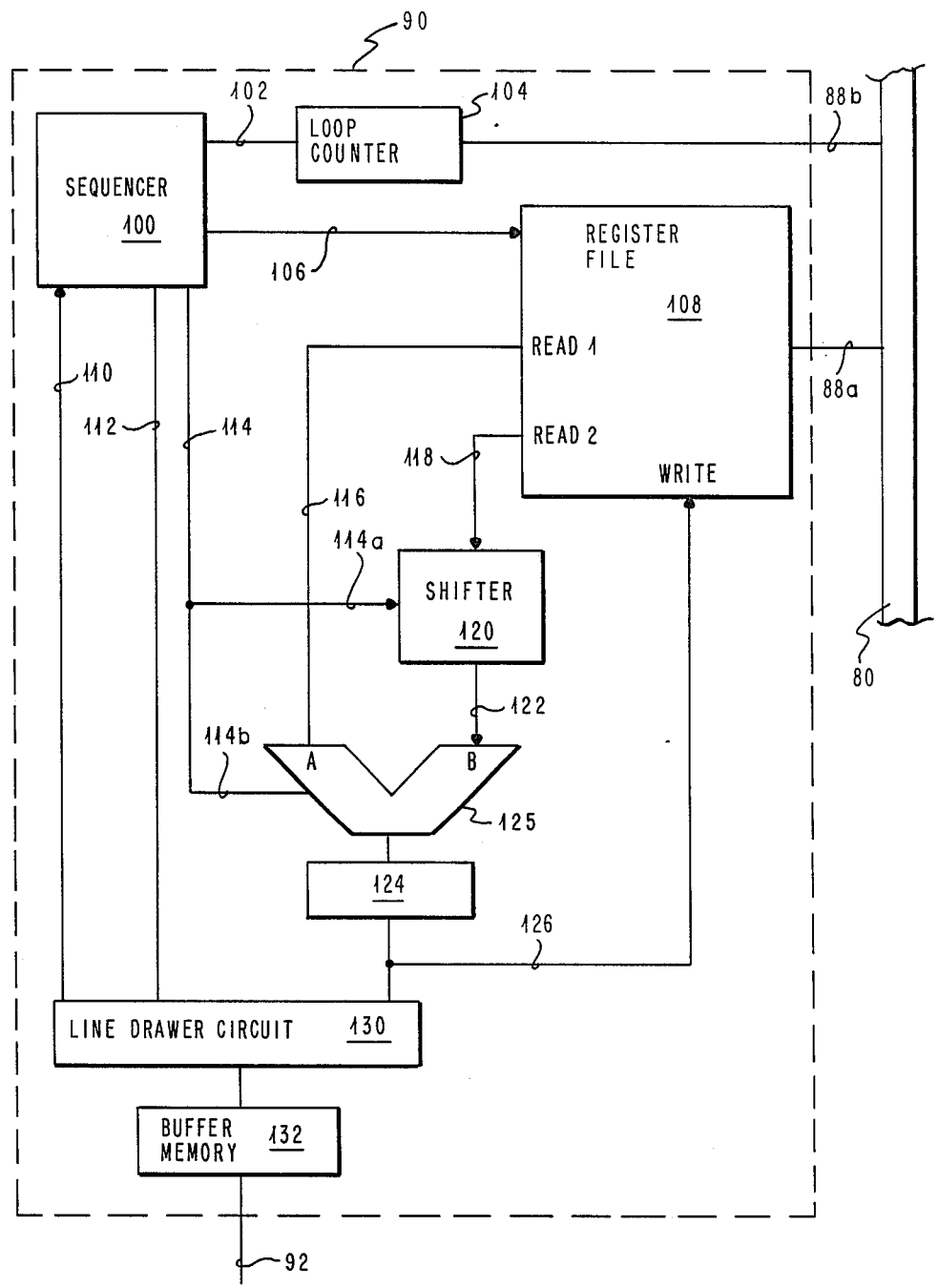
FIG. 5 is a block diagram of one embodiment of a curve generator.

FIG. 5 is a block diagram of the curve generator 90 of FIG. 4. In FIG. 5, a sequencer is provided to control an adder 125 by line 114b and a shifter 120 by line 114a. Line 114b controls adder 125 to either add the contents from lines 116 and 122 or to pass the contents of line 122. Additionally, the sequencer 100 controls a register file 108. Register file 108 is connected to the I/O bus 80 to receive initial values of D1, D2, D3 and F. A loop counter 104 is connected to I/O bus 80 by line 88b to provide a loop count to sequencer 100 by line 102. Sequencer 100 further provides a control interface via lines 110 and 112 to a line drawer circuit 130 such as the NEC 7220. Line drawer circuit 130 is connected to receive the output from a latch 124 on line 126. The value in latch 124 is the output of adder 125. The line drawer circuit 130 receives each of the curve coordinate values that define the curve. Further, the line drawer circuit 130 computes line values that convert these curve points defined by the curve coordinate values. The combination of lines and points define the on or off state of each pixel element (pel) for the display. Line drawer circuit 130 provides the pel data to a buffer memory 132 which is in turn provided by line 92 to the display to display the resulting curve image.

The sequencer 100, loop counter 104, register file 108, shifter 120 and adder 125 are configured to compute the forward difference values computed in step 74, the curve coordinate value (S[J]) of step 74 and the loop counter control functions of steps 70 and 76. Therefore, processor 82 need only compute the initial geometry vector coefficients and the initial forward differencing values. After storing the initial forward difference values in register file 108 via line 88a from the I/O bus 80, processor 82 will initiate the loop counter 104 and the sequencer 100 will begin the computation of the forward difference values and resulting curve coordinate value for each of the intervals automatically. These values will be input to the line drawer circuit 130 via line 126. Line 112 would be used by sequencer 100 to signal to the line drawer circuit 130 that a value on 126 is ready to be input. Line drawer circuit 130 provides a wait signal on line 110 to sequencer 100 to delay computation of a curve coordinate value until the line drawer circuit 130 is ready. In this embodiment, the final divide operation is performed by the approximate division technique illustrated in Appendix B. The implementation of this technique requires the operation of the shifter 120 under control of the sequencer 100 via line 114a to compute the final curve coordinate value which would be stored in latch 124 until input to the line drawer circuit 130 over line 126. It should be understood that the circuitry of FIG. 5 must be repeated for each of the coordinate elements or the computations in the circuitry in FIG. 5 must be repeated for these coordinate elements.

Figure 6A:
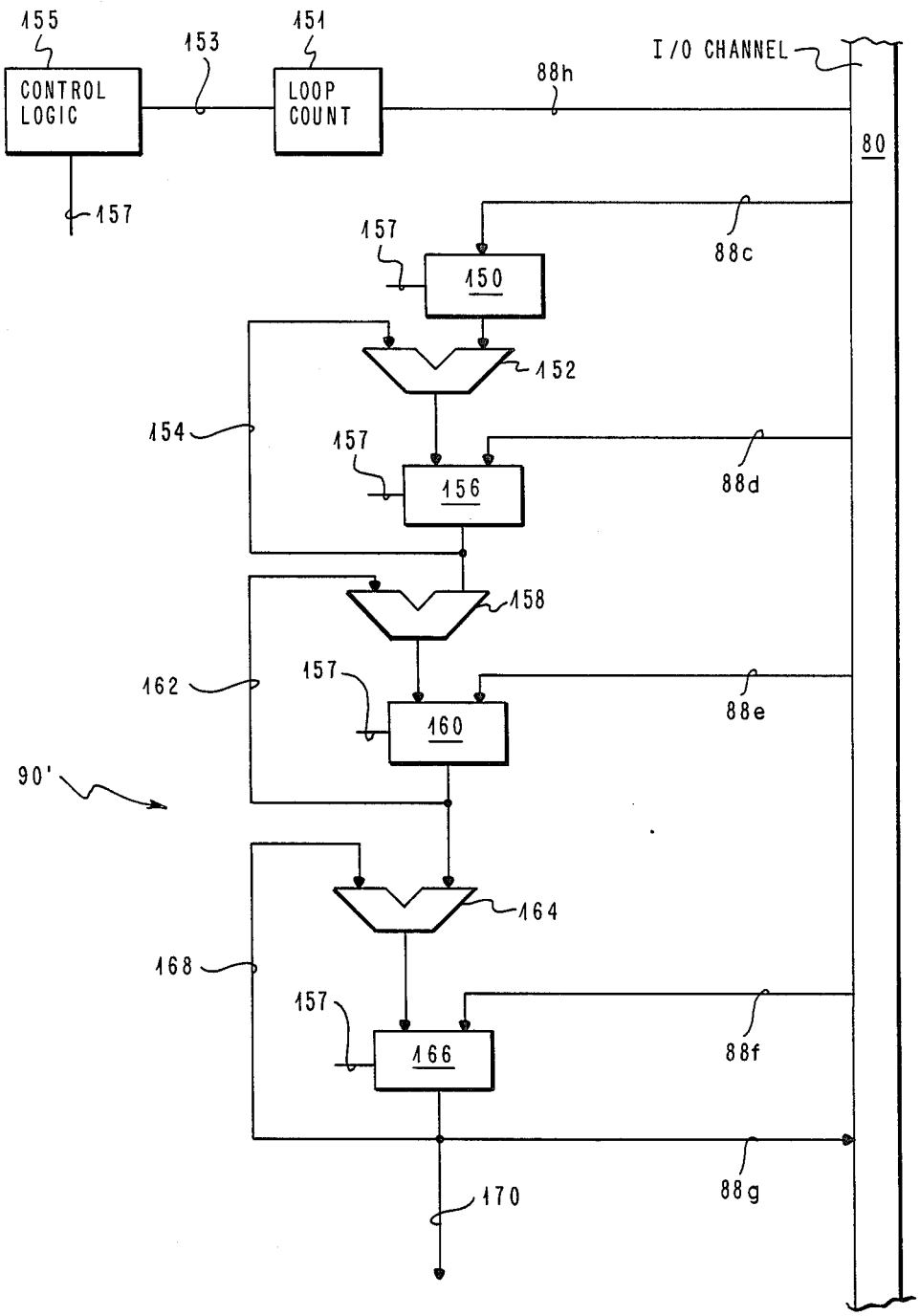
FIGS. 6A and 6B are block diagrams of a second embodiment of a curve generator.
Figure 6B:
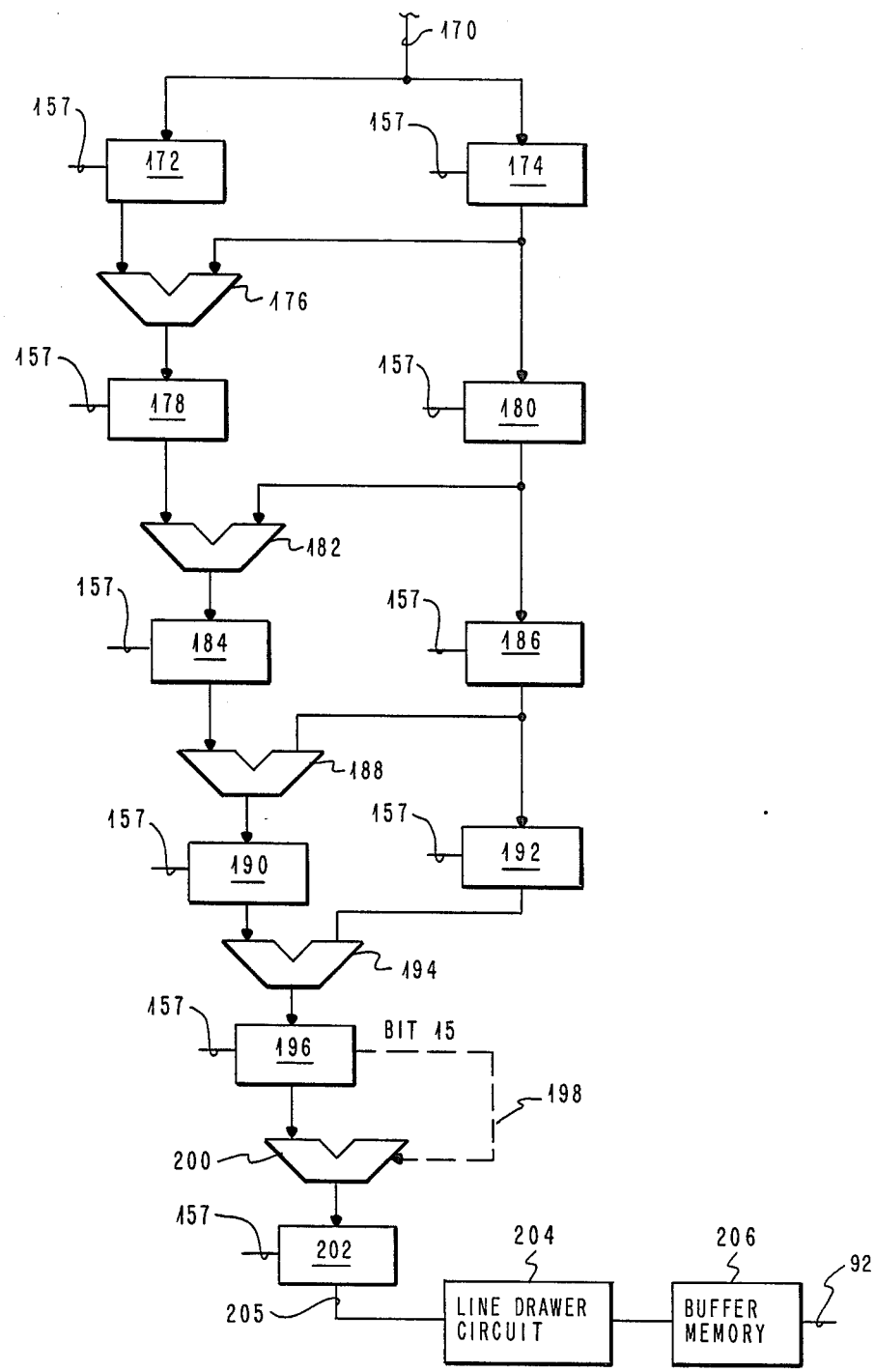

FIGS. 6A and 6B are block diagrams of a second embodiment of the curve generator circuit 90 in FIG. 4. Again, this circuitry is to compute the forward difference values and the curve coordinate values computed in step 74 and the loop counter control functions of steps 70 and 76 of FIG. 3B. Referring to FIG. 6A, a control logic circuit 155 is connected to a loop counter 151 via line 153 and produces control lines 157 and 159. Line 157 controls registers 150, 156, 160, and 166. Initially, register 150 is loaded with the value D3 via line 88c. Register 156 is loaded with the value D2 for the third loop iteration. Register 160 is loaded with the value of D1 for the second loop iteration via line 88e. Register 166 is loaded with the value F for the first loop iteration via line 88f. The output of register 166 on line 88g may be provided back to the processor 82 if necessary. The output on line 170 is provided to the section to perform the approximate divided technique of Appendix B providing a result per clock cycle.

This approximate divide circuitry is illustrated in FIG. 6B. The F value on line 170 is input to registers 172 and 174. These are registers that received shifted values. Register 172 received F shifted right by three binary positions. Register 174 receives F shifted right by five binary positions. The contents of register 174 is loaded into adder 176 together with the contents of register 172. The contents of register 174 is also input into register 180. Adder 176 provides an output to register 178 which contains the partial quotient of F over 8 plus F over 32. The contents of register 180 is received shifted right by 2 binary positions and is provided to adder 182 together with the contents of register 178. The result from adder 182 is then provided to register 184 which is a partial quotient consisting of F over 8 plus F over 32 plus F over 128. The contents from register 180 is input to register 182 and is received right shifted by two binary positions. Again, the contents of register 186 is combined in adder 188 with the contents of register 184 resulting in a partial quotient input to register 190 consisting of F over 8 plus F over 32 plus F over 128 plus F over 512. The contents of register 186 is then input to register 192 and is received right shifted two binary locations. The contents of register 192 is input to adder 194 with the contents of register 190 to provide the scaled quotient. Roundoff is accomplished by the adder 200 which takes the 15th bit of the scaled quotient in register 196 and adds it to the contents of register 196 right shifted by 15 binary positions. The output of adder 200 is placed in register 202. As before, this curve coordinate value is then provided to the line drawer 204 by line 205. The line drawer then combines the curve coordinate values for all the coordinate elements to produce the curve coordinate points and further lines connecting these points. This data is then provided as pel information to the buffer memory 206 which provides the image data via line 92 to the display circuitry 96 (FIG. 4).

Although the invention has been described with reference to these specific embodiments, this description is not meant to be construed in a limiting sense. Various modifications of this disclosed embodiment, as well as other embodiments of the invention, will become apparent to those persons skilled in the art upon reference to these descriptions of this invention. It is, therefore, contemplated that the appended claims will cover any such modifications or embodiments that fall within the true scope of the invention.

APPENDIX A

Cubic B-Splines are piecewise polynomials that are of general interest to computer graphics. There are many ways to specify these curves but a very useful formulation is presented in the book *Fundamentals of Interactive Computer Graphics* by J. D. Foley and A. Van Dam on pages 521 and 522. This yields the following matrix formula:

$$x(t) = [t^3\ t^2\ t\ 1]\ [1/6] \begin{bmatrix} -1 & 3 & -3 & 1 \\ 3 & -6 & 3 & 0 \\ -3 & 0 & 3 & 0 \\ 1 & 4 & 1 & 0 \end{bmatrix} \begin{bmatrix} P_{i-1} \\ P_i \\ P_{i+1} \\ P_{i+2} \end{bmatrix}$$

The variable t is a parametric variable that ranges from 0 to 1, and the variable P represents X-axis coordinates of the B-Spline control points. The value of (1/6) is just a scalar and can be moved anywhere in the matrix expression. Ignoring the scalar term of (1/6) for the time being, carrying out the matrix multiplication and gathering terms yields the following cubic equation:

$$(t^3)\ (-P_{i-1} + 3P_i - 3P_{i+1} + P_{i+2}) +$$
$$(t^2)\ (3P_{i-1} - 6P_i + 3P_{i+1}) + (t)\ (-3P_{i-1} + 3P_{i+1}) +$$
$$(P_{i-1} + 4P_i + P_{i+1})$$

FORWARD DIFFERENCE METHOD

The standard form of the cubic equation is:

$$at^3 + bt^2 + ct + d = 0$$

From the book *Principles of Interactive Computer Graphics* (second edition) by W. M. Newman and R. F. Sroull the following method is discussed for forward differencing a cubic polynomial. Given that the intervals on t are equal in size and that the evaluation will start at t=0, the next point can be evaluated with only three additions. This is well known but is often not used because the forward differencing requires floating point calculations. However, forward differencing can be extended to scaled integers. This will remove the objection that floating point forward differencing often leads to numerically unstable computations because of cumulative roundoff error. From Newman and Sproull, pages 327 and 328 we find:

The initial conditions are $$p = d$$

$$\alpha_1 = a\delta^3 + b\delta^2 + c\delta$$

$$\alpha_2 = 6a\delta^3 + 2b\delta^2$$

$$\alpha_3 = 6a\delta^3$$

The recurrence relation is $$p = p + \alpha_1$$

$$\alpha_1 = \alpha_1 + \alpha_2$$

$$\alpha_2 = \alpha_2 + \alpha_3$$

The variable $\delta$ is 1/n where n is the number of intervals in t. The computation is performed for the X-axis coordinates of points on the B-Spline curve and then for the corresponding Y-axis coordinates. To illustrate the following values are chosen for the X-axis coordinates of the control points:

$$P_{i-1} = 10;\ P_i = 5;\ P_{i+1} = 9;\ P_{i+2} = 20;$$

When t=0, then x(t)=39/6=6.5.
When t=0.1, then x(t)=38.968/6=6.495.

The divide by 6 computation in forward differencing will be postponed until the very end so that all of the resulting values of the forward differenced polynomial will be 6 times too big.

FLOATING POINT FORWARD DIFFERENCING

Applying floating point forward differencing to the polynomial results in the following equations:

$$p = 39$$

The actual point is (p/6) or (39/6) = 6.5

$$\alpha_1 = (-2)(0.1^3) + (27)(0.1^2) + (-3)(0.1) = -0.032$$

$$\alpha_2 = (6)(-2)(0.1^3) + (2)(27)(0.1^2) = 0.528$$

$$\alpha_3 = (6)(-2)(0.1^3) = -0.012$$

The recurrence relation for t=0.1 yields $$p = 39 + (-0.032) = 38.968$$

The actual point is (38.968/6) or ≠6.495

$$\alpha_1 = (-0.032) + (0.528) = 0.496$$

$$\alpha_2 = (0.528) + (-0.012) = 0.516$$

The next point on the polynomial is at t=0.2, and results in the following:

$$p = 38.968 + (0.496) = 39.464$$

The actual point is (39.464/6) or ≠6.577

$$\alpha_1 = (0.496) + (0.516) = 1.012$$

$$\alpha_2 = (0.516) + (-0.012) = 0.504$$

SCALED FORWARD DIFFERENCE METHOD

The application of the scaled forward difference equations is a simple extension to the floating point forward differencing. The scaled forward difference is
Let $$e = [(0.1)(10)]^3 = 1$$

$$f = [(0.1)(10)]^2(10) = 10$$

$$g = [(0.1)(10)](10)^2 = 100$$

Then $$p = [(39)(10^3)]/[(6)(10^3)] = 6.5$$

$$\alpha_1 = (-2)(e) + (27)(f) + (-3)(g) = -32$$

$$\alpha_2 = (6)(-2)(e) + (2)(27)(f) = 528$$

$$\alpha_3 = (6)(-2)(e) = -12$$

The values of e, f, and g are the key to scaled integer forward differencing. If n is the number of intervals, then $$e = 1$$

$$f = n$$

$$g = n^2$$

The common denominator is $n^3$.

This is simply a way to get a common denominator for the entire expression so that as each point is computed it can be descaled by dividing by one value. In the case of our example the common term is 1,000. This is simply the number of intervals, n, cubed, and in the example the value of n is 10. The divide by 6 accounts for the scalar in the original matrix expression and this divide operation must also be performed so that the correct value of x(t) will be computed.

The recurrence relation for $t = 0.1$ yields $$p = (39,000 - 32) = 38,968$$

The actual point is (38,968/6,000) or $\neq 6.495$ $$\alpha_1 = (-32) + (528) = 496$$

$$\alpha_2 = (528) + (-12) = 516$$

Note that the scalar has to be scaled since the division will be performed in the last operation.

The next point on the polynomial is at $t = 0.2$, and results in the following scaled forward difference equations:

$$p = [38,968 + (496)] = 39,464$$

The actual point is (39,464/6,000) or $\neq 6.577$ $$\alpha_1 = (496) + (516) = 1012$$

$$\alpha_2 = (516) + (-12) = 504$$

Any radix may be chosen for the scaling. A power of 2 is appropriate so that the scaling could be accomplished with a series of shifts. Because the final division by 6 is delayed, scaling by a power of 2 is performed before the forward differencing. As each point, p, is computed it can be deflated by shifting right. Then the division by 6 can be carried out on the smaller value of p. Such a savings is attractive with a RISC architecture machine such as the IBM RT PC. In fact the division by 6 can be approximated by a series of shifts and adds as illustrated in Appendix B. All operations in the scaled version are integer operations.

The remaining question is how many intervals are appropriate for the parameter space, t. The answer depends on the size of the control points, P, and the number of intervals for the parameter space, t.

Let q be the number of bits that it takes to represent the range of control point values, P, and let r be the number of bits that it takes to represent the number of intervals, n, that the parametric variable, t, is divided.

$$q = \lceil \log_2 P \rceil \text{ and,}$$

$$r = \lceil \log_2 n \rceil$$

such that q and r are the ceiling of their respective logarithmic expressions.

The positive range of values is contained within:
$(3)(r) + (2 + q) + 1$ bits, and the negative range of values is contained within:
$(3)(r) + (2 + q) + 2$ bits, so the combined number of bits to represent the range of values is:

$$(3)(r) + (2 + q) + 2 \text{ bits.}$$

As an example, if the coordinates of the control points can be represented in 10 bits and the integers are 32 bit integers, then we can have at most 64 intervals in the parameter space t. This is because $$2^6 = 64, \text{ so } r = 6, \text{ and } q = 10.$$

Then the number of bits is $$(3)(6) + (2 + 10) + 2 = 32 \text{ bits.}$$

APPENDIX B

Divide by 6 Overview

Division by 6 can be approximated by a series of shifts and adds. The method to be described is appropriate for a bitmap up to 3,172 pels by 3,172 pels, but even a 1,024 by 1,024 will require the same number of steps. It should also be noted that the minimum scaling factor would be $2^{13}$. Relating that to the number of increments in the curve drawing hardware requires at least $2^5$ or or 32 intervals to be drawn per section. The division by 6 is approximated to the required degree of accuracy by the following series:

$$\sum_{n=1}^{5} \frac{1}{2^{(2n+1)}} \approx 0.166503906$$

$$\frac{1}{8} + \frac{1}{32} + \frac{1}{128} + \frac{1}{512} + \frac{1}{2,048} \approx 0.166503906$$

The number will still have to be descaled by $n3 = n^3$ which is another shift operation. The approximate error between this series and the true value of 1/6 is approximately 0.00016276 or about 1 in. 6,144. If the error should be no more than half a pel, then this will be sufficient for a bit map that is 3,072 by 3,072 pels.

Divide by 6 Example

As an example, assume that 177.5/6 is the screen coodinate for a point on the curve. Assume that the number of line segment intervals for each section of the curve is 32 or $2^5$. This means that the scaling factor is $2^{15}$ or 32,768. Note that hexadecimal numbers will be indicated by a subscript of hex and a binary number will be indicated by a subscript of binary. All other numbers will be based 10 by default. The number that would result from the scaled forward difference method would be $$(6)(177.5/6)(2^{15}) = (177.5)(32,768) = 5,816,320 = 58C000_{hex}$$

The approximate divide requires two register, $R_0$ and $R_1$. Designating the scaled number $\lambda$, then the initial conditions are:

$$R_0 = \left(\frac{1}{8}\right)(\lambda), \text{ and } R_1 = \left(\frac{1}{32}\right)(\lambda)$$

These are effected by shifting the original scaled value, $\lambda$, right by 3 bits and 5 bits respectively. The original value in our example is $$58C000_{hex}, \text{ or } 0101\ 1000\ 1100\ 0000\ 0000\ 0000$$

The divide be 6 will be approximated in the following 5 steps and then the final descaling and rounding will be accomplished by the 6th step.

Step 1

The initial vaue of $R_0$ is $$R_0 = \frac{58C000_{hex}}{8} = B1800_{hex}$$

This is equivalent to shifting the binary value right by 3 bits so that $$R_0 = 1011\ 0001\ 1000\ 0000\ 0000_{binary}$$

Step 2

The initial value of $R_1$ is $$R_1 = \frac{58C000_{hex}}{32} = 2C600_{hex}$$

This is equivalent to shifting the binary value right by 5 bits so that $$R_1 = 0010\ 1100\ 0110\ 0000\ 0000_{binary}$$

Finally in step 2 the contents of $R_1$ is added into $R_0$ so that at the end of step 2 the contents of the registers are $$R_0 = B1800_{hex} + 2C600_{hex} = DDE00_{hex}, \text{ and}$$
$$R_1 = 2C600_{hex}$$

Step 3

In step 3 the contents of $R_1$ are shifted two bits to the right. Since the previous value of $R_1$ ($\lambda/32$), the resulting value in $R_1$ is equivalent to ($\lambda/128$). In this example the value is $$R_1 = B180_{hex}$$

This value is ten added into the value of $R_0$ so that at the end of step 3 the contents of the registers are $$R_0 = DDE00_{hex} + B180_{hex} = E8F80_{hex}, \text{ and}$$
$$R_1 = B180_{hex}$$

Step 4

The contents of $R_1$ are again shifted two bits to the right. Since the previous value of $R_1$ was ($\lambda/128$), the resulting value in $R_1$ is equivalent to ($\lambda/512$). In this example the value is $$R_1 = 2C60_{hex}$$

This value is then added into the value of $R_0$ so that at the end of step 4 the contents of the registers are $$R_0 = E8F80_{hex} + 2C60_{hex} = EBBE0_{hex}, \text{ and}$$
$$R_1 = 2C60_{hex}$$

Step 5

The contents of $R_1$ are again shifted two bits to the right. Since the previous value of $R_1$ was ($\lambda/512$), the resulting value in $R_1$ is equivalent to ($\lambda/2.048$). In this example the value is $$R_1 = B18_{hex}$$

This value is then added into the value of $R_0$ so that at the end of step 5 the contents of the registers are $$R_0 = EBBE0_{hex} + B18_{hex} = EC6F8_{hex}, \text{ and}$$
$$R_1 = B18_{hex}$$

Step 6

The final step is to descale and round the value. This will result in the correctly rounded version of the screen coodinate that lies on the curve. Since the scaling in this example was by $2^{15}$, the result must be descaled by the same amount. The scaling was done by powers of 2 so that descaling could be accomplished with a shift right by the appropriate number of bits. The resulting number from step 5 was $EC6F8_{hex}$ which was left in $R_0$. In binary this is $$EC6F8_{hex} = 1110\ 1100\ 0110\ 1111\ 1000_{binary}$$

The number is shifted right by 15 bits which is equivalent to dividing by $2^{15} = 32,768$. This would result in the correct truncated result, but rounding can be accomplished by detecting whether or not the last bit to be truncated is a 1 or 0. If it is 0, then the truncated result is correctly rounded. If it is a 1, then the truncated result should have 1 added to it. In hex representation we find $$\frac{EC6F8_{hex}}{8000_{hex}} = 1D_{hex}$$

After the shift the following binary fraction where the period indicates the radix point results. To the left of the radix point is integer and to the right of the radix point is fraction.

$$\frac{EC6F8_{hex}}{8000_{hex}} = 0001\ 1101 \cdot 1000\ 1101\ 1111_{binary}$$

The last bit to be truncated is a 1 and 1 is added to the result of $1D_{hex}$ which yields $1E_{hex}$.

The decimal equivalent of the original coodinate number is:

$$\frac{177.5}{6} \approx 29.583$$

The correctly rounded result is 30 and that is the result of this fast and efficient method since $1E_{hex}=30$

We claim:

1. A method for producing a visual representation of a curve image from a set of control points which define the curve and which are input for each dimension and a number of intervals of the curve to be computed, said method comprising the steps of:
   (a) computing a set of scaled vector coefficient integers for each dimension from the set of input control points for that dimension and from a scaling parameter;
   (b) computing forward difference interval coefficient integers for each dimension for each interval from the scaled vector coefficient integers for that dimension and the interval integer number;
   (c) computing the curve coordinate values for each interval for each dimension from the forward difference interval coefficient integers for that dimension for each interval and the scaling parameter; and
   (d) displaying the curve by displaying curve coordinate points in accordance with the computed curve coordinate values for each dimension and a plurality of straight lines which successively connect said computed curve coordinate points.

2. A method for producing a visual representation of a curve according to claim 1 wherein said step of computing the set of scaled vector coefficient integers includes the step of computing the scaling parameter from a B-spline formulation constant and the number of intervals.

3. A method for producing a visual representation of a curve accordino to claim 2 wherein said step of computing the forward difference interval coefficient integers for each dimension includes incrementing the interval number and computing the forward difference interval coefficient integers for that interval number.

4. A method for producing a visual representation of a curve according to claim 3 wherein said steps (a), (b), and (c) each include the steps of multiplication by only binary shifting and addition.

5. A method for producing a visual representation of a curve according to claim 4 wherein all division calculation for steps (a), (b), and (c) are performed in the last arithmetic operation of step (c).

6. A method for producing a visual representation of a curve image from a set of control points which define the curve and which are input for each dimension and a number of intervals of the curve to be computed, said method comprising the steps of:
   (a) computing a scaling factor from the number of intervals and a constant to produce integer vector coefficients for the control points;
   (b) computing a subset of scaled vector coefficient integers for each dimension from a B-spline basis matrix and a corresponding subset of input control points starting with the first sequentially located control point and including a fixed number of adjacent sequentially located control points to complete the subset, and from the scaling factor;
   (c) computing forward difference interval coefficient integers for each dimension from the subset of scaled vector coefficient integers for that dimension and the interval integer number;
   (d) computing the curve coordinate values for each dimension from the forward difference interval coefficient integers for that dimension and from the scaling parameter;
   (e) incrementing the interval number and repeating steps (c) and (d) for each of the remaining interval numbers;
   (f) repeating steps (b) through (e) by incrementally progressing through the remaining control points by changing the subset to include the next sequentially located control point while dropping the first sequentially located control point from the subset; and
   (g) providing visual indicia of the curve by providing visual indicia of the curve coordinate points in accordance with the computed curve coordinate values for each dimension and a plurality of straight lines which successively connect said computed curve coordinate points.

7. A method for producing a visual representation of a curve according to claim 6 wherein said steps (a), (b), (c) and (d) each include the steps of multiplication by only binary shifting and addition.

8. A method for producing a visula representation of a curve according to claim 7 wherein all division calculations for steps (a), (b), (c), and (d) are performed in the last arithmetic operation of step (d).

9. An apparatus for producing a visual representation of a curve image comprising:
   input means for receiving a plurality of data points defining the curve image and a number of interval computations to be performed between said data points;
   digital processing means for pipeline computing curve coodinate values for each dimension for a plurality of intervals simultaneously; and
   displaying means for producing the visula representation of the curve image by displaying curve coordinate points in accordance with computed curve coordinate values for each dimension and a plurality of straight lines which successively connect said computed curve coordinate points.

10. An apparatus according to claim 9 wherein said processing means includes integer arithmetic means for computing said curve coodinate values.

11. An apparatus according to claim 10 wherein said integer arithmetic means includes a plurality of arithmetic stages for performing integer arithmetic and having a last stage to perform an integer divide operation.

12. An apparatus according to claim 11 wherein said integer arithmetic means arithmetic stages provide multiplication operations by performing binary shifting and adding operations.

13. An apparatus according to claim 12 wherein said last arithmetic stage for performing said integer divide operation includes means for performing binary shifting and adding operations.

14. An apparatus for producing e visual representation of a curve image comprising:
   input means for receiving a plurality of control points defining the curve and a number cf intervals representing the number of computations between said control points;
   processing means for executing instructions on data wherein said instructions include instructions for:
   (1) computing a set of scaled vector coefficient integers for each dimension from the set of input control points for that dimension and from a scaling parameter;

(2) computing forward difference interval coefficient integers for each dimension for each interval from the scaled vector coefficient integers for that dimension and the interval integer number; and (3) computing the curve coordinate values for each interval for each dimension from the forward difference interval coefficient integers for that dimension for each interval and the scaling parameter;

memory means for storing said instructions and said data; and display means for displaying the curve by displaying curve coordinate points in accordance with the computed curve coordinate values for each dimension and displaying a plurality of straight lines which successively connect said computed curve coodinate points.

* * * * *

UNITED STATES PATENT AND TRADEMARK OFFICE
CERTIFICATE OF CORRECTION

PATENT NO. : 4,760,548
DATED : July 26, 1988
INVENTOR(S) : David C. Baker et al

It is certified that error appears in the above-identified patent and that said Letters Patent is hereby corrected as shown below:

Col. 15, line 35, delete "accordino" and insert --according--.
Col. 16, line 22, delete "visula" and insert --visual--.
Col. 16, line 36, delete "visula" and insert --visual--.
Col. 16, line 57, delete "e visual" and insert --a visual--.
Col. 16, line 60, delete "cf" and insert --of--.

Signed and Sealed this

Twenty-ninth Day of October, 1991

Attest:

HARRY F. MANBECK, JR.

Attesting Officer

Commissioner of Patents and Trademarks